(12) United States Patent
He et al.

(10) Patent No.: US 9,703,745 B2
(45) Date of Patent: Jul. 11, 2017

(54) STORAGE DEVICE AND MOTHERBOARD ABLE TO SUPPORT THE STORAGE DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Miao He, Shenzhen (CN); Guo-Yi Chen, Shenzhen (CN); Xiao-Gang Yin, Shenzhen (CN)

(73) Assignees: HONG FU JIN INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 801 days.

(21) Appl. No.: 14/014,526

(22) Filed: Aug. 30, 2013

(65) Prior Publication Data

US 2015/0019784 A1 Jan. 15, 2015

(30) Foreign Application Priority Data

Jul. 15, 2013 (CN) .......................... 2013 1 0294196

(51) Int. Cl.
*G06F 13/00* (2006.01)
*G06F 13/40* (2006.01)

(52) U.S. Cl.
CPC .... *G06F 13/409* (2013.01); *G06F 2213/0024* (2013.01)

(58) Field of Classification Search
CPC ........... G06F 13/409; G06F 2213/0026; G06F 1/1632
USPC ..... 710/301–306, 316–317, 100; 361/679.32
See application file for complete search history.

(56) References Cited

U.S. PATENT DOCUMENTS

| 8,189,328 | B2 * | 5/2012 | Kanapathippillai | ..... G11C 5/04 361/679.31 |
| 2010/0167557 | A1 * | 7/2010 | Hoang | ................... H05K 1/117 439/62 |
| 2011/0153903 | A1 * | 6/2011 | Hinkle | .................... G06F 13/20 710/313 |
| 2012/0173794 | A1 * | 7/2012 | Royer, Jr. | ........... G06F 11/1451 711/103 |
| 2013/0170128 | A1 * | 7/2013 | Liu | ........................... G06F 1/26 361/679.32 |

(Continued)

*Primary Examiner* — Tim T Vo
*Assistant Examiner* — Kim T. Huynh
(74) *Attorney, Agent, or Firm* — Steven Reiss

(57) ABSTRACT

A motherboard assembly able to use a PCI slot either to expand system function or for the installation of additional memory includes a motherboard and a storage device. The motherboard includes a PCI expansion slot, a platform controller hub (PCH), and a power circuit. The PCI expansion slot includes a protrusion, four idle pins and first signal pins connected to the PCH, and first power pins connected to the power circuit. A control chip, a number of storage chips connected to the control chip, and a power unit are arranged on the storage device. A non-central notch is included in an edge connector arranged on a bottom edge of the storage device and the edge connector allows for power pins connected to the power unit and signal pins connected to the control chip.

7 Claims, 3 Drawing Sheets

(56) References Cited

U.S. PATENT DOCUMENTS

2014/0233192 A1* 8/2014 Hsu .................. G06F 1/185
  361/737
2014/0321044 A1* 10/2014 Liu .................. G06F 1/185
  361/679.32

* cited by examiner

STORAGE DEVICE AND MOTHERBOARD ABLE TO SUPPORT THE STORAGE DEVICE

BACKGROUND

1. Technical Field

The present disclosure relates to a motherboard supporting a storage device.

2. Description of Related Art

Storage capacities in computer systems can be expanded through adding hard disk drives or using serial advanced technology attachment dual in-line memory module (SATA DIMM) devices. However, the hard disk drives and the SATA DIMM devices are expensive, and support devices for mounting the hard disk drives and the memory slots for receiving the SATA DIMM devices will occupy some space of the motherboard. At present, peripheral component interconnection (PCI) slots may also be built into the motherboard, to expand system functions of the computer system through connecting PCI devices. However, for users who do not desire or prefer to expand the system function, some PCI slots may be unoccupied. These idle slots are useless for users not desiring to expand the system function, and thus these extra PCI slots are essentially wasting real estate on the motherboard. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean "at least one."

Figure 1:
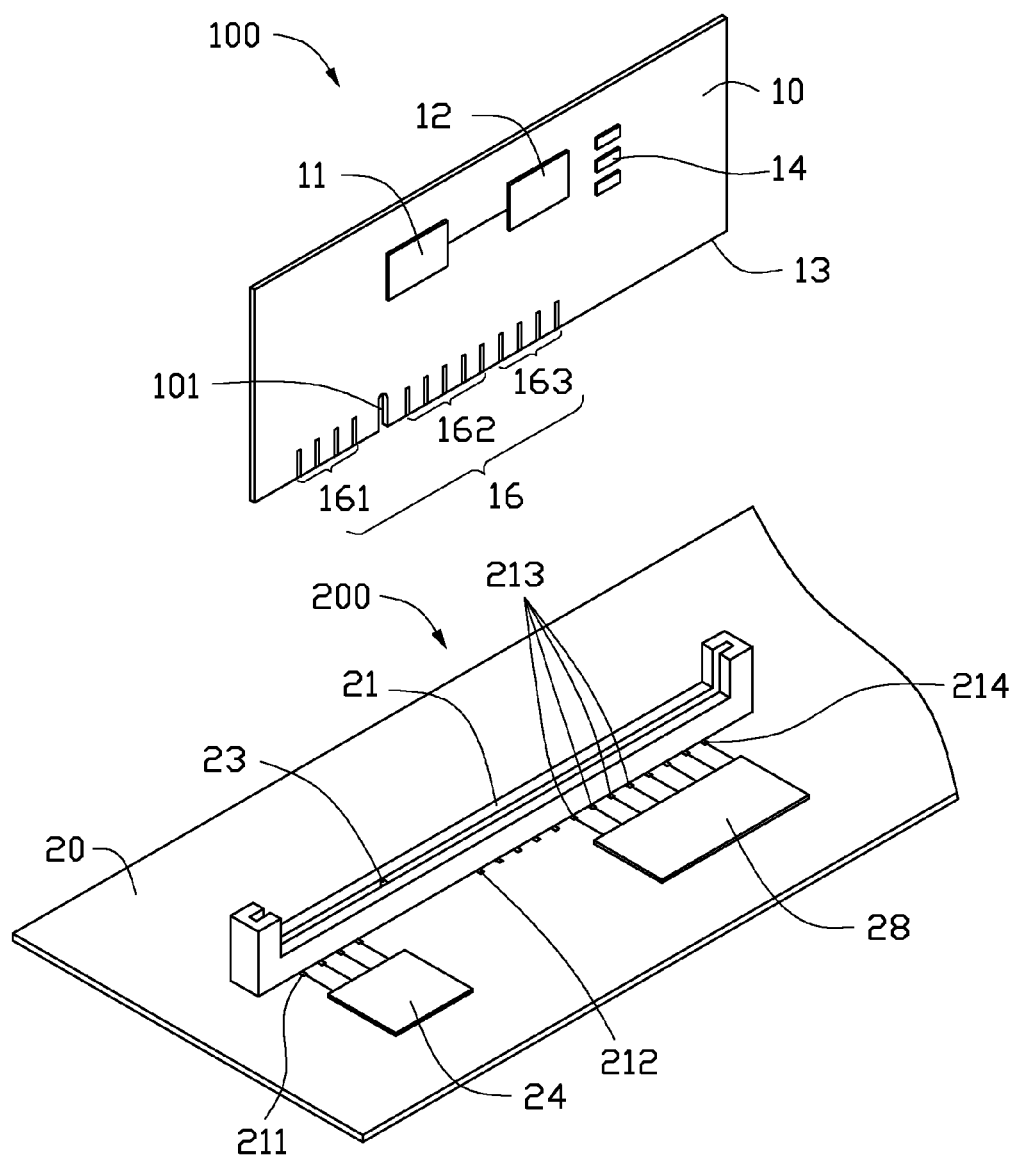
FIG. 1 is an exploded, isometric view of a storage device and a motherboard supporting the storage device in accordance with an embodiment of the present disclosure.
Figure 2:
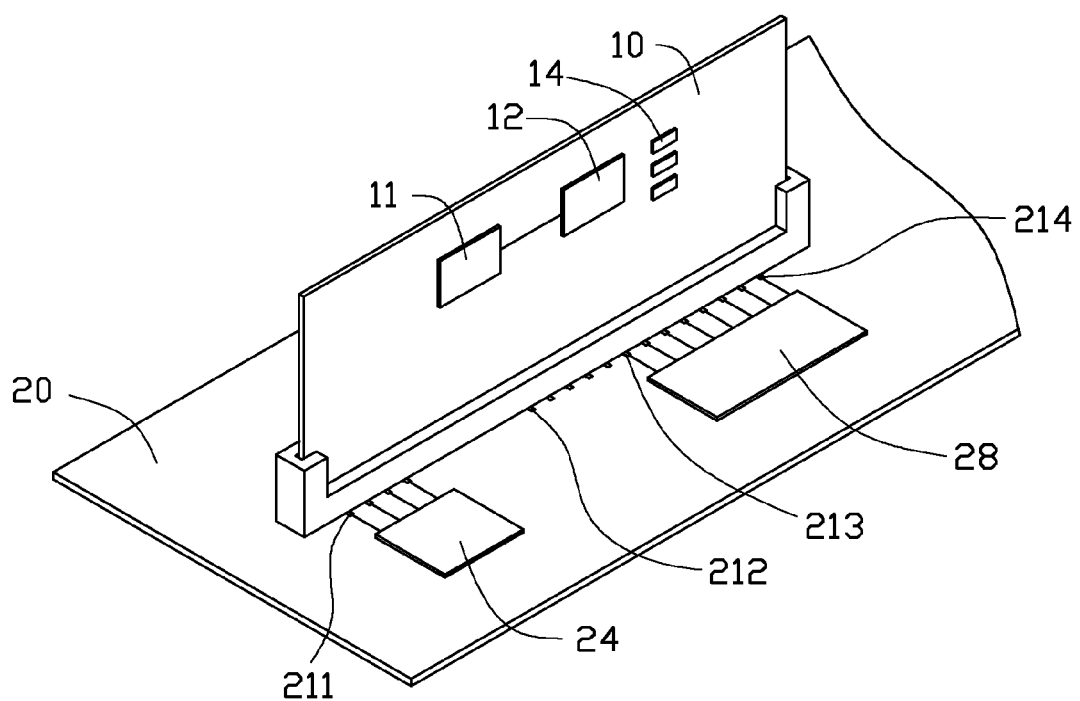
FIG. 2 is an assembled, isometric view of the storage device and the motherboard of FIG. 1.

FIGS. 1 and 2 show a storage device 100 in accordance with an embodiment. The storage device 100 includes a substantially rectangular circuit board 10. A power unit 11, a control chip 12, and a plurality of storage chips 14 are arranged on the circuit board 10. The power unit 11 is connected to the control chip 12 and the storage chips 14. The storage chips 14 store data. In other embodiments, the number of the control chip 12 and the storage chips 14 can be changed according to need. A non-central notch 101 and an edge connector 16 are arranged on a bottom edge 13 of the circuit board 10. The edge connector 16 includes a plurality of power pins 161, a plurality of ground pins 162, and four signal pins 163. The signal pins 163 include a pair of signal input pins and a pair of signal output pins, and are connected to the control chip 12. The power pins 161 are connected to the power unit 11. The ground pins 162 are connected to a ground layer (not shown) of the circuit board 10. In one embodiment, the signal pins 163 transmit serial advanced technology attachment (SATA) signals. The power unit 11 converts a voltage from the edge connector 16 and provides the converted voltage to the control chip 12 and the storage chips 14.

The motherboard 200 includes a circuit board 20. A platform controller hub (PCH) 28, an expansion slot 21, and a power circuit 24 are all arranged on the circuit board 20. In one embodiment, the expansion slot 21 is a peripheral component interconnection (PCI) slot. The expansion slot 21 includes a protrusion 23 arranged in the expansion slot 21, a plurality of power pins 211, a plurality of ground pins 212, a plurality of idle pins (such as four idle pins 213), and a plurality of signal pins 214. The power pins 211 are connected to the power circuit 24. The ground pins 212 are connected to a ground layer (not shown) of the circuit board 20. The idle pins 213 and the signal pins 214 are connected to the PCH 28. The PCH 28 can output SATA signals through the idle pins 213 or can output PCI signals through the signal pins 214, through the setup of a basic input output system (BIOS) of the motherboard 200.

In use, when the storage capacity of the motherboard 200 needs to be expanded, the edge connector 16 is inserted into the expansion slot 21, and the protrusion 23 is engaged in the non-central notch 101. The power pins 161, the ground pins 162, and the signal pins 163 of the edge connector 16 are electrically connected to the power pins 211, the ground pins 212, and the idle pins 213 of the expansion slot 21 respectively. At the same time, the PCH 28 outputs SATA signals through the setup of the BIOS of the motherboard 200.

When the motherboard 200 receives power, the motherboard 200 outputs a voltage to the power unit 11 through the power circuit 24, the power pins 211, and the power pins 161. The power unit 11 converts the received voltage and provides the converted voltage to the control chip 12 and the storage chips 14. At the same time, the PCH 28 outputs a hard disk drive (HDD) signal, such as a SATA signal, to the control chip 12 through the idle pins 213 and the signal pins 163, to enable the control chip 12 to control the reading and writing of data in the storage chips 14.

Figure 3:
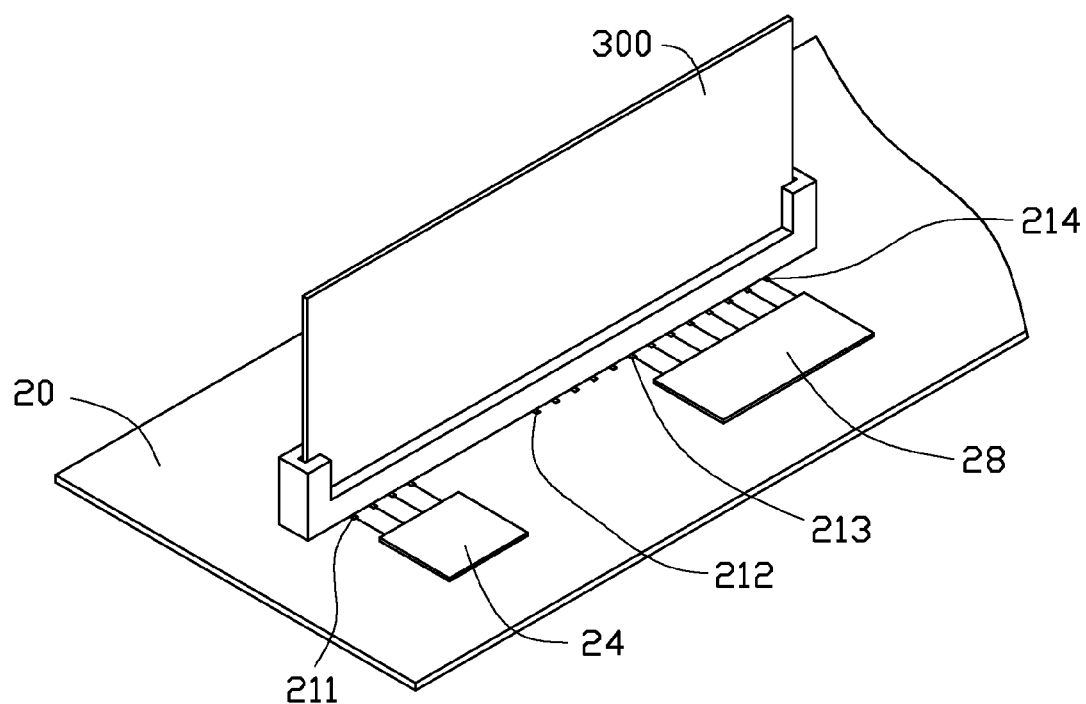
FIG. 3 is an assembled, isometric view of the motherboard of FIG. 1 receiving a peripheral component interconnection (PCI) device.

Referring to FIG. 3, when the motherboard 200 needs to receive a PCI device for expanding the system function, a PCI device 300 is inserted into the expansion slot 21, and the protrusion 23 is engaged in a notch of the PCI device 300. Power pins, ground pins, and signal pins of the PCI device 300 are electrically connected to the power pins 211, the ground pins 212, and the signal pins 214 of the expansion slot 21 respectively. At the same time, the PCH 28 outputs PCI signals through the setup of the BIOS of the motherboard 200.

When the motherboard 200 receives power in this situation, the motherboard 200 outputs a voltage to the PCI device 300 through the power circuit 24, the power pins 211, and the power pins of the PCI device 300. At the same time, the PCH 28 outputs a bus signal, such as a PCI signal to the PCI device 300 through the signal pins 214 and the signal pins of the PCI device 300, to enable the PCI device 300 to communicate with the motherboard 200.

The PCH 28 of the motherboard 200 outputs SATA signals to the storage device 100 inserted in the expansion slot 21 through the idle pins 213 of the expansion slot 21, to expand the storage capacity of the motherboard 200, or the PCH 28 can output PCI signals to the PCI device 300 inserted into the expansion slot 21 through the signal pins 214 of the expansion slot 21, to expand the system function of the motherboard 200. Therefore, the storage capacity or the system function of the motherboard 200 can be expanded through a PCI slot.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A motherboard for supporting a storage device, the motherboard comprising:
    a circuit board;
    a platform controller hub (PCH) mounted on the circuit board;
    a power circuit mounted on the circuit board; and
    an expansion slot mounted on the circuit board, and comprising a protrusion arranged in the expansion slot, four idle pins connected to the PCH, a plurality of power pins connected to the power circuit, a plurality of ground pins grounded, and a plurality of signal pins connected to the PCH;
    wherein when the storage capacity of the motherboard needs to be expanded, the storage device is inserted into the expansion slot, the PCH outputs a hard disk drive signal to the storage device through the idle pins; when the system function of the motherboard needs to be expanded, a peripheral component interconnection (PCI) device is inserted into the expansion slot, the PCH outputs a bus signal to the PCI device through the signal pins.

2. The motherboard of claim 1, wherein the expansion slot is a PCI slot.

3. The motherboard of claim 1, wherein the hard disk drive signal is a serial advanced technology attachment (SATA) signal, and the bus signal is a PCI signal.

4. A motherboard assembly comprising:
    a motherboard comprising a first circuit board, an expansion slot mounted on the first circuit board, a platform controller hub (PCH) mounted on the first circuit board, and a first power circuit mounted on the first circuit board, the expansion slot comprising a protrusion, four idle pins electrically connected to the PCH, a plurality of first power pins electrically connected to the power circuit, a plurality of first ground pins grounded, and a plurality of first signal pins connected to the PCH; and
    a storage device comprising a second circuit board, a power unit arranged on the second circuit board, a plurality of storage chips arranged on the second circuit board and connected to the power unit, a control chip arranged on the second circuit board and connected to the power unit and the plurality of storage chips, and an edge connector and a notch set on a bottom edge of the second circuit board to be detachably engaged in the expansion slot of the motherboard, the edge connector comprising a plurality of second power pins connected to the power unit, a plurality of second ground pins grounded, and four second signal pins connected to the control chip;
    wherein in response to the edge connector of the expansion card being engaged in the expansion slot of the motherboard, the protrusion is engaged in the notch, the plurality of first power pins of the expansion slot is connected to the plurality of second power pins of the storage device, the plurality of first ground pins of the expansion slot is connected to the plurality of second ground pins of the storage device, and the four idle pins of the expansion slot are connected to the four second signal pins of the storage device, the PCH outputs a hard disk drive signal to the storage device through the idle pins, the storage device is disassembled for the insertion of a peripheral component interconnection (PCI) device to the expansion slot, and when the PCI device is inserted into the expansion slot, the PCH outputs a bus signal to the PCI device through the signal pins.

5. The motherboard assembly of claim 4, wherein the four second signal pins of the storage device comprises a pair of signal input pins and a pair of signal output pins.

6. The motherboard assembly of claim 4, wherein the expansion slot is a peripheral component interconnection (PCI) slot.

7. The motherboard assembly of claim 4, wherein the four second signal pins transmit serial advanced technology attachment (SATA) signals.

* * * * *

UNITED STATES PATENT AND TRADEMARK OFFICE
CERTIFICATE OF CORRECTION

PATENT NO. : 9,703,745 B2
APPLICATION NO. : 14/014526
DATED : July 11, 2017
INVENTOR(S) : He et al.

Page 1 of 1

It is certified that error appears in the above-identified patent and that said Letters Patent is hereby corrected as shown below:

On the Title Page

Item [73], insert:
--HONG FU JIN PRECISION INDUSTRY (SHENZHEN) CO., LTD., Shenzhen (CN)
HON HAI PRECISION INDUSTRY CO., LTD., New Taipei (TW)--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*